(12) United States Patent  (10) Patent No.: US 8,512,202 B2
Oota et al.  (45) Date of Patent: Aug. 20, 2013

(54) SHIFT CONTROLLER AND SHIFT CONTROLLING METHOD

(75) Inventors: Yoshikazu Oota, Hadano (JP); Ryozo Hiraku, Ebina (JP); Takeshi Morita, Yokohama (JP); Akira Takano, Atsugi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 243 days.

(21) Appl. No.: 13/168,235

(22) Filed: Jun. 24, 2011

(65) Prior Publication Data

US 2011/0319225 A1    Dec. 29, 2011

(30) Foreign Application Priority Data

Jun. 28, 2010 (JP) ............... P2010-145939
Apr. 7, 2011 (JP) ............... P2011-085432
Jun. 21, 2011 (JP) ............... P2011-136848

(51) Int. Cl.
*B60W 20/00*  (2006.01)

(52) U.S. Cl.
USPC ............... 477/5; 477/39; 903/930; 903/945

(58) Field of Classification Search
USPC .............. 903/930, 945; 477/39, 5
See application file for complete search history.

(56) References Cited

U.S. PATENT DOCUMENTS

| 8,226,528 B2 * | 7/2012 | Yokokawa et al. | 477/44 |
| 8,414,450 B2 * | 4/2013 | Ueno et al. | 477/5 |
| 2008/0176707 A1 * | 7/2008 | Yamamoto et al. | 477/5 |

FOREIGN PATENT DOCUMENTS

JP    2000-023313 A    1/2000

* cited by examiner

*Primary Examiner* — Sherry Estremsky
(74) *Attorney, Agent, or Firm* — Foley & Lardner LLP

(57) ABSTRACT

A shift controller controls a transmission for a hybrid vehicle in which: an engine and a motor are connected together via a clutch; and the transmission is placed between the motor and driving wheels. The shift controller has: a first shift controlling unit which performs shift control on a basis of at least one of transmission efficiency of the transmission and power generation efficiency of the motor in a case where regeneration is performed with the clutch disengaged during deceleration of the hybrid vehicle; and a second shift controlling unit which performs shift control to make a transmission gear ratio of the transmission smaller than in the shift control performed by the first shift controlling unit in a case where the regeneration is performed with the clutch engaged during the deceleration of the hybrid vehicle.

19 Claims, 8 Drawing Sheets

SHIFT CONTROLLER AND SHIFT CONTROLLING METHOD

TECHNICAL FIELD

The disclosure relates to a shift controller and a shift controlling method for a hybrid vehicle.

BACKGROUND

As shown in Japanese Patent Application Laid-Open No. 2000-23313, a proposal has been made on a running gear for a hybrid vehicle in which: a first clutch is provided between a drive axle of an engine and a drive axle of a motor; and a second clutch is provided between a continuously variable transmission and driving wheels. This running gear for a hybrid vehicle disengages the first clutch during the deceleration of the vehicle. Thereby, the running gear is capable of causing the regenerative brake of the motor to work alone without allowing the engine brake to work on the driving wheels, and accordingly capable of efficiently collecting the energy produced by the brake regeneration due to the deceleration.

Nevertheless, the running gear for a hybrid vehicle as described in Japanese Patent Application Laid-Open No. 2000-23313 preferably keeps the first clutch engaged during the deceleration in some cases such as a case where no sooner is the first clutch released than the engine needs to be started. In such cases, the first clutch continues being engaged instead of being disengaged during the deceleration, and the motor and the engine are connected together via the first clutch. Accordingly, the regeneration efficiency decreases as a result of reduction in the regenerative energy due to lost torque of the engine.

An object of the present invention is to provide a shift controller and a shift controlling method which are capable of enhancing the regeneration efficiency.

SUMMARY

According to an embodiment of the present invention, there is provided a shift controller for a hybrid vehicle in which: an engine and a motor are connected together via a clutch; and a transmission is placed between the motor and driving wheels. The shift controller comprises: a first shift controlling unit configured to perform shift control on a basis of at least one of transmission efficiency of the transmission and power generation efficiency of the motor in a case where regeneration is performed with the clutch disengaged during deceleration of the hybrid vehicle; and a second shift controlling unit configured to perform shift control to make a transmission gear ratio of the transmission smaller than in the shift control performed by the first shift controlling unit in a case where the regeneration is performed with the clutch engaged during the deceleration of the hybrid vehicle.

BRIEF DESCRIPTION OF DRAWINGS

FIG. 4A shows the relationship at the highest transmission gear ratio, and FIG. 4B shows the relationship at the middle transmission gear ratio.

FIG. 7A shows a vehicle speed [km/h]; FIG. 7B shows regenerative energy [kJ]; FIG. 7C shows the number of rotations inputted to a motor [rpm]; and FIG. 7D shows torque inputted into the motor [Nm].

DESCRIPTION OF EMBODIMENTS

Figure 1:
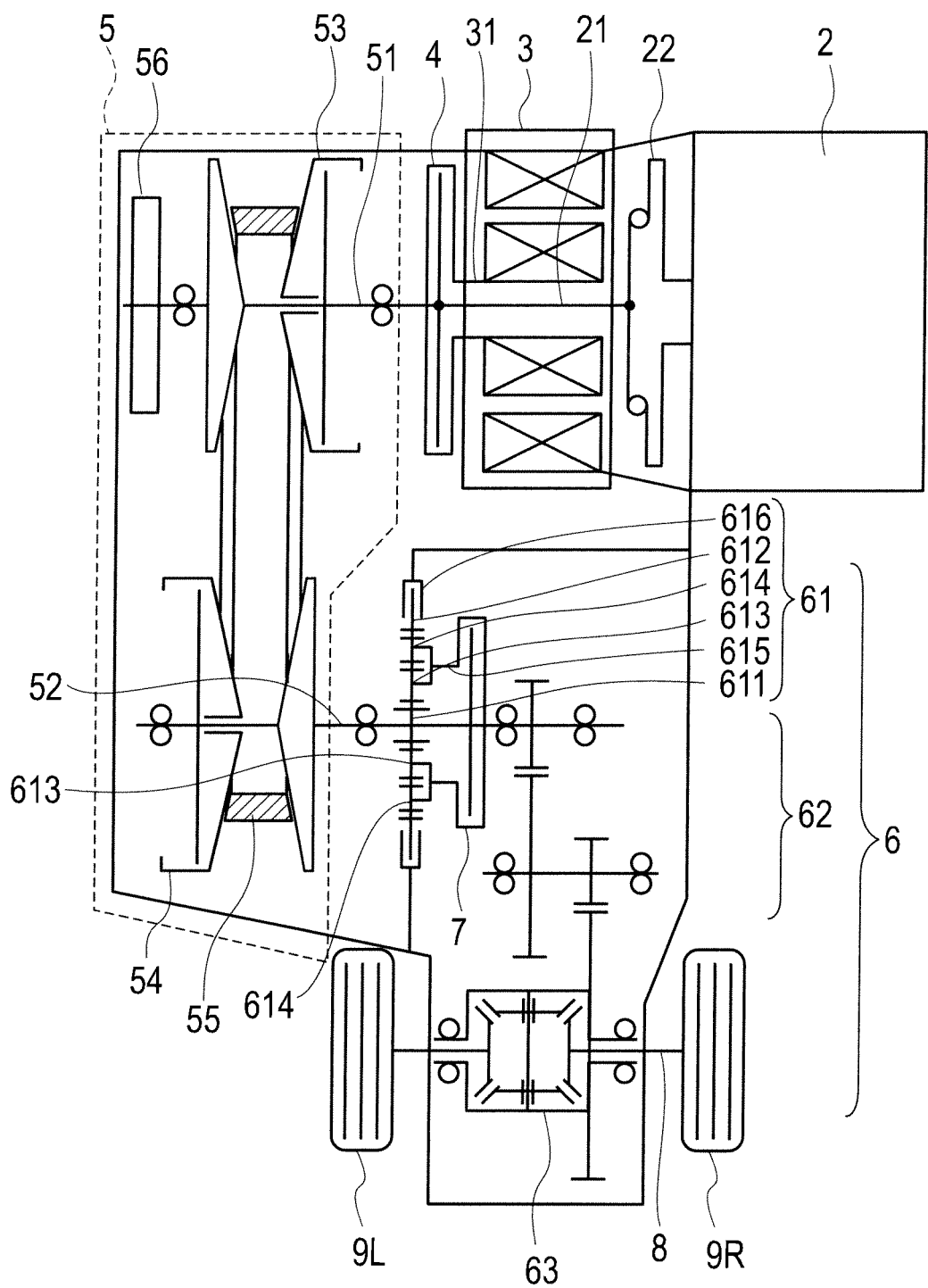
FIG. 1 is a schematic configuration diagram showing a hybrid vehicle in which an operation controller of an embodiment is installed.

Descriptions will be hereinbelow provided for embodiments of the present invention on a basis of the drawings. FIG. 1 is a schematic configuration diagram showing a hybrid vehicle in which an operation controller of the embodiment is installed. As shown in FIG. 1, a hybrid vehicle includes an engine 2, a motor 3, a first clutch (referred to as a "clutch" from time to time) 4, a continuously variable transmission mechanism (referred to as a "transmission" from time to time) 5, a power transmission mechanism 6, a second clutch 7, a drive axle 8, driving wheels 9L, 9R.

The engine is an internal combustion engine configured to drive using fuel such as gasoline, and includes a drive shaft 21 configured to rotationally drive while the engine is driven. In addition, the drive shaft 21 includes a torque absorbing damper 22. The torque absorbing damper 22 is configured to suppress variation in the torque which occurs each time the engine 2 makes one rotation. Incidentally, the engine 2 is not limited to the internal combustion engine, and may be an external combustion engine such as a stirling engine.

The motor 3 is an electric motor configured to drive depending on power supply, and includes a drive shaft 31 configured to rotationally drive while the motor is driven. Furthermore, the motor 3 is configured to function as a power generator for generating power while the drive shaft 31 is receiving rotational torque from the outside. The drive shaft 31 of the motor 3 is hollow, and the drive shaft 21 of the engine is loosely inserted in the inside of the drive shaft 31 coaxially.

The first clutch 4 is configured to connect and disconnect the drive shafts 21, 31 at the end portions of the drive shafts 21, 31, which are situated on the same side. Moreover, the drive shaft 31 of the motor 3 is directly connected to the continuously variable transmission mechanism 5 irrespective of the disengaging operation of the first clutch 4. In other words, while the first clutch 4 is engaged, the drive shaft 21 of the engine 2 and the drive shaft 31 of the motor 3 are connected to the continuously variable transmission mechanism 5. While the first clutch 4 is disengaged, only the drive shaft 31 of the motor 3 is connected to the continuously variable transmission mechanism 5. The first clutch 4 is configured to be switched between engagement and disengagement depending on the operation from the outside.

The continuously variable transmission mechanism 5 is what is termed as a CVT (standing for Continuously Variable Transmission). The continuously variable transmission mechanism 5 includes an input shaft 51 and an output shaft 52. The input shaft 51 and the out shaft 52 include pulleys 53, 54, respectively. These pulleys 53, 54 are connected together via a belt 55, and are accordingly configured to rotate simultaneously. In addition, the continuously variable transmission mechanism 5 includes an oil pump 56. The continuously variable transmission mechanism 5 is capable of changing the width of a space between belt receiving surfaces of the respective pulleys 53, 54 by adjusting an amount of oil supplied from the oil pump 56. For this reason, the belt 55 is capable of changing its radius of rotation on each of the pulleys 53, 54. Thereby, a rotation-per-minute ratio (transmission gear ratio) between the input shaft 51 connected to the pulley 53 and the output shaft 52 connected to the pulley 54 is adjusted freely.

An output from the continuously variable transmission mechanism 5 is configured to be transmitted to the driving wheels 9L, 9R via the output shaft 52, the power transmission 6 and the second clutch 7. The power transmission mechanism 6 includes a double-pinion planetary gear mechanism 61, a gear train 62, and differential gears 63.

The double-pinion planetary gear mechanism 61 includes a sun gear 611, an internal gear 612, two pairs of double pinions 613, 614, an arm 615, and a reverse-travel brake 616. The sun gear 611 is a gear whose axis coincides with the axis of the output shaft 52, and the movement of the sun gear 611 is linked to the movement of the output shaft 52. The internal gear 612 is a gear which is situated on the same axis as is the sum gear 611.

Each pair of double pinions 613, 614 are gears in mesh with each other. One of a first pair of the double pinions 613, 614 is also in mesh with the sun gear 611, while the other of the first pair of double pinions 613, 614 is also in mesh with the internal gear 612. The arm 615 is configured to hold the first pair of double pinions 613, 614 in a way that the double pinions 613, 614 are capable of revolving about themselves. The arm 615 is configured to hold the second pair of double pinions 613, 614 symmetrically with the first pair of double pinions 613, 614 with respect to the output shaft 52. Furthermore, the arm 615 is connected to the output shaft 52 via the second clutch 7. Moreover, the reverse-travel brake 616 is configured to restrict the rotation of the internal gear 612 from the outside of the internal gear 612.

Let us assume that because of this configuration, the second clutch 7 is engaged, and the rotation of the internal gear 612 is not restricted by the reverse-travel brake 616. In this case, when the sun gear 611 rotates, the arm 615 and the internal gear 612 integrally rotate in the same direction as does the sun gear 611. For this reason, the rotation of the output shaft 52 is transmitted straight to the downstream gear train 611.

Let us assume, on the other hand, that the second clutch 7 is disengaged, and the rotation of the internal gear 612 is restricted by the reverse-travel brake 616. In this case, when the sun gear 611 rotates, the double pinions 613, 614 revolve about themselves in a direction opposite to the revolution of the sun gear 611 between the sun gear 611 and the internal gear 612. For this reason, the rotation in the direction opposite to the direction of the output shaft 52 is transmitted to the downstream gear train 62.

The gear train 62 is that in which multiple gears are arranged in mesh with each other. For this reason, the rotation transmitted to the gear train 62 is decelerated by the multiple gears constituting the gear train 62, and the resultant decelerated rotation is transmitted to the differential gears 63. The differential gears 63 is configured to transmit the torque, which is transmitted from the gear train 62, to each of the driving wheels 9L, 9R, and concurrently to allow the difference in the number of rotations between the driving wheels 9L, 9R which occurs when the vehicle runs curves.

Figure 2:
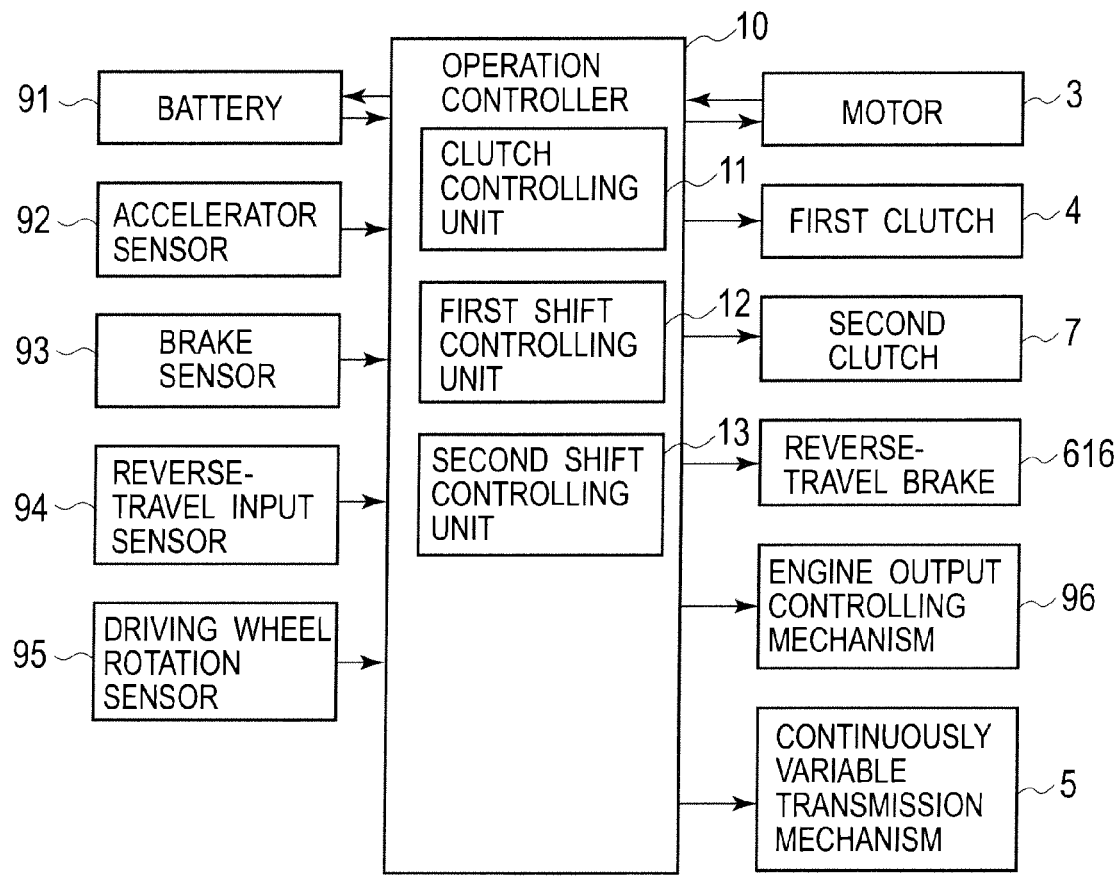
FIG. 2 is a block diagram showing the operation controller of the embodiment.

FIG. 2 is a block diagram showing the operation controller of the embodiment. Incidentally, FIG. 2 shows the various components to clarify a relationship among connections performed in the operation controller. As shown in FIG. 2, an operation controller (shift controller) 10 has a function of controlling the various components while receiving the respective various signals.

To put it concretely, the operation controller 10 is connected to an accelerator sensor 92, a brake sensor 93, a reverse-travel input sensor 94, a driving wheel rotation sensor 95 and an engine output controlling mechanism 96. The accelerator sensor 92 is a sensor configured to sense the amount of depression of the accelerator pedal (specifically, a sensor configured to sense the amount of direct acting displacement of the accelerator pedal) for accelerating the hybrid vehicle. The brake sensor 93 is a sensor configured to sense the amount of depression of the brake pedal for braking the hybrid vehicle (a sensor of the same type as the accelerator sensor). The reverse-travel input sensor 94 is a sensor (specifically, a micro switch or the like) configured to sense whether or not the driver of the hybrid vehicle inputs an operation for a reverse travel. The driving wheel rotation sensor 95 is a sensor (specifically, an encoder or the like) mounted on the rotary axle of the driving wheel 9L, and configured to sense the number of rotations of the rotary axle thereof. The engine output controlling mechanism 96 is a mechanism configured to control the angle of turn of the throttle of the engine, and accordingly configured to control the output. The operation controller 10 is configured to control the output from the engine output controlling mechanism 96 on the basis of the outputs from the respective sensors 92 to 96.

The operation controller 10 is further connected to a battery 91, and is configured to cause the battery 91 to supply a power to the motor and to charge the battery 91 by causing the motor 3 to generate a power.

In this respect, when the hybrid vehicle decelerates, the hybrid vehicle is capable of transmitting the rotations of the respective driving wheels 9L, 9R to the motor 3 by: disengaging the first clutch 4; and thereby detaching the engine 2 from the driving wheels 9L, 9R. By this, the hybrid vehicle is capable of enhancing the regeneration efficiency.

Nevertheless, the hybrid vehicle preferably performs the regeneration without disengaging the first clutch 4 in some cases. Let us assume, for example, that when the driver requests reacceleration during the deceleration, the torque needed for the reacceleration is larger than a maximum torque which the motor 3 is capable of producing. In this case, the hybrid vehicle fails to achieve the reacceleration by using the torque of the motor 3 alone. For this reason, it is better that the hybrid vehicle should perform the regeneration without disengaging the first clutch 4. To put it in detail, if the first clutch 4 is disengaged in the foregoing case, the hybrid vehicle may have to follow the procedure in which; the first clutch 4 is engaged after the reacceleration is requested; and subsequently, the engine 2 is started to produce the engine torque. This makes the time lag between the reacceleration request and the engine torque production longer, and makes the driver feel unpleasant.

With this taken into consideration, the operation controller 10 of the embodiment includes a clutch controlling unit (clutch controlling means) 11, a first shift controlling unit (first shift controlling means) 12 and a second shift controlling unit (second shift controlling means) 13.

The clutch controlling unit 11 is configured to make control to choose between performing the regeneration with the first clutch 4 disengaged and performing the regeneration with the first clutch 4 engaged on the basis of judgment on whether or not the reacceleration can be achieved by use of only the motor 3 during the deceleration. The clutch controlling unit 11 is configured to make the control to choose between performing the regeneration with the first clutch 4 disengaged and performing the regeneration with the first clutch 4 engaged on the basis of judgment on whether or not the torque needed for the reacceleration is larger than the maximum torque which the motor 3 is capable of producing.

The first shift controlling unit 12 is configured to perform shift control on the basis of at least one of the transmission efficiency of the continuously variable transmission mechanism 5 and the power generation efficiency of the motor 3 in a case where the regeneration is performed with the first clutch 4 disengaged during the deceleration of the vehicle. To put it concretely, the first shift controlling unit 12 controls the transmission gear ratio to minimize the transmission loss of the continuously variable transmission mechanism 5, for example, in consideration of the transmission efficiency of the continuously variable transmission mechanism 5. Otherwise, the first shift controlling unit 12 controls the transmission gear ratio to increase the power generation efficiency of the motor 3 in consideration of the power generation efficiency of the motor 3.

Figure 9:
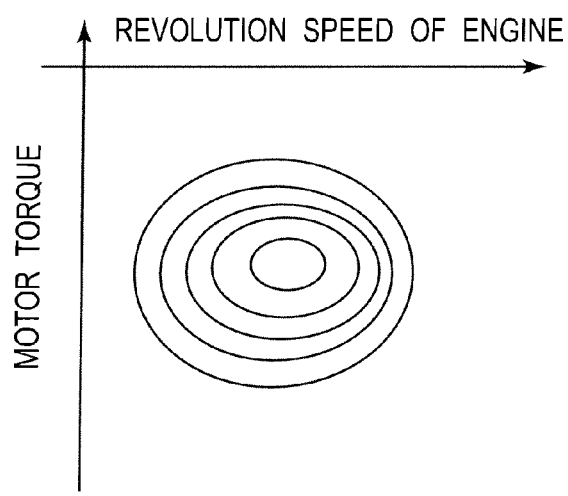
FIG. 9 is a correlation diagram showing a relationship of the generation efficiency of the motor 3 for the revolution speed of the motor 3 and the torque of the motor 3.

FIG. 9 is a correlation diagram showing a relationship of the generation efficiency of the motor 3 for the revolution speed of the motor 3 and the torque of the motor 3. The horizontal axis of FIG. 9 defines the revolution speed of the motor 3 and vertical axis defines of FIG. 9 defines the torque of the motor 3. Then the generation efficiencies of the motor 3 form figures similar to the elliptic. Each of the lines in FIG. 9 shows same value of the generation efficiency respectively. The inner the line is, the higher the generation efficiency of the motor 3 is. The correlation diagram of FIG. 9 is decided according to the unique characteristics of the motor 3. By using the correlation diagram of FIG. 9, the transmission gear ratio can be elected so as to set the values of the revolution speed and the torque of the motor 3 such that the generation efficiency of the motor 3 becomes higher. Therefore, it is possible to enhance the generation efficiency of the motor 3, then to enhance the efficiency of the regeneration during the deceleration.

In addition, the first shift controlling unit 12 is configured to control the transmission gear ratio in order that the torque inputted into the motor should be equal to or less than a motor tolerable torque which the motor 3 can tolerate when the regeneration is to be performed with the first clutch 4 disengaged. Thereby, the first shift controlling unit 12 increases the power generation efficiency of the motor 3 while preventing the occurrence of a situation in which the motor 3 cannot collect the regenerative torque because the torque needed for the reacceleration exceeds the motor tolerable torque.

Furthermore, the first shift controlling unit 12 is configured to perform the shift control in a way that the transmission gear ratio becomes the highest when the hybrid vehicle stops after the continued deceleration of the hybrid vehicle. That is because this configuration makes the hybrid vehicle capable of smoothly starting even when the hybrid vehicle stops as a result of the continued deceleration.

The second shift controlling unit 13 is configured to perform the shift control in a way that the transmission gear ratio of the continuously variable transmission mechanism 5 becomes smaller when the shift control is performed by the second shift controlling unit 13 than in the shift control performed in the first shift controlling unit 12, in a case where the regeneration is performed with the first clutch 4 engaged during the deceleration of the vehicle. In this respect, when the transmission gear ratio is decreased, the loss in the engine torque can be decreased accordingly. For this reason, while the motor 3 and the engine 2 are connected together with the first clutch 4 engaged, it is possible to enhance the efficiency of the regeneration during the deceleration in exchange of the reduction in the loss in the engine torque.

Figure 3:
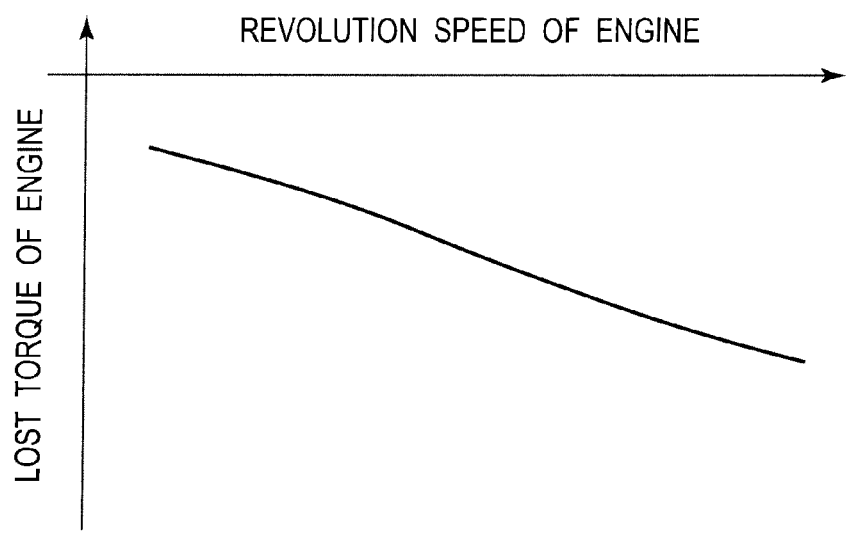
FIG. 3 is a correlation diagram showing a relationship between the revolution speed of an engine and the loss in engine torque.

FIG. 3 is a correlation diagram showing a relationship between the revolution speed of the engine 2 and the loss in the engine torque. As shown in FIG. 3, there is a tendency in which the lost torque of the engine 2 decreases as the revolution speed of the engine 2 decreases. For this reason, in the case where the regeneration is performed with the first clutch 4 engaged during the deceleration of the vehicle, the second shift controlling unit 13 reduces the lost torque of the engine in exchange of the reduction in the revolution speed of the engine by making the transmission gear ratio of the continuously variable transmission mechanism 5 when the shift control is performed by the second shift controlling unit 13 than in the shift control performed in the first shift controlling unit 12 (that is to say, by making the transmission gear ratio higher). Thereby, the second shift controlling unit 13 enhances the efficiency of the regeneration.

Figure 4A:
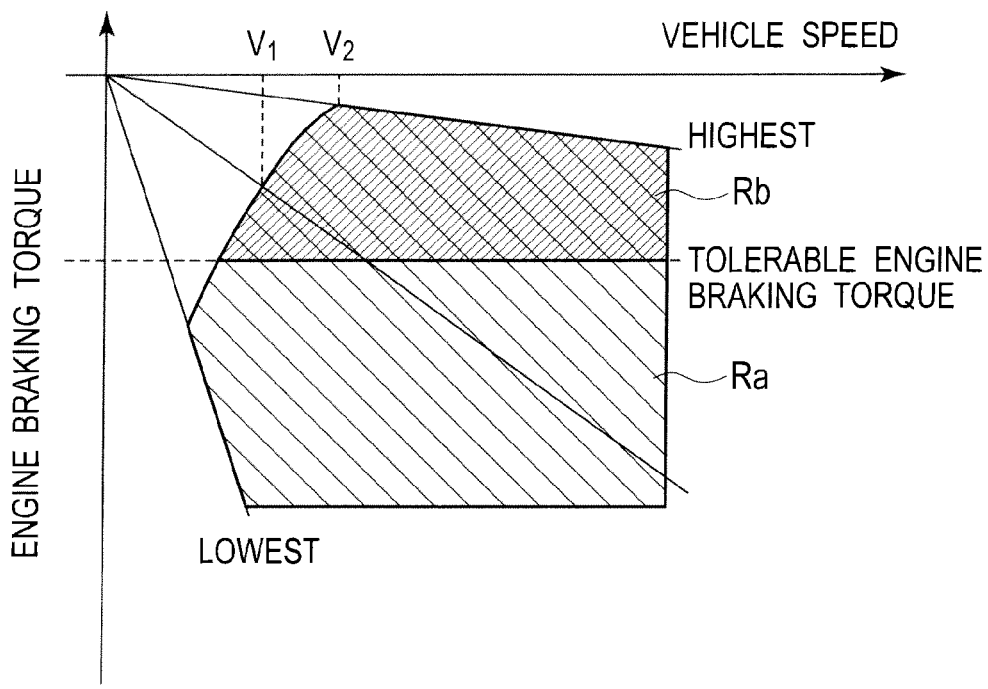
FIGS. 4A and 4B are correlation diagrams showing a relationship between the vehicle speed and the braking torque attributable to lost torque of the engine (i.e., engine braking torque) which is calculated in terms of the torque of the drive shaft.
Figure 4B:
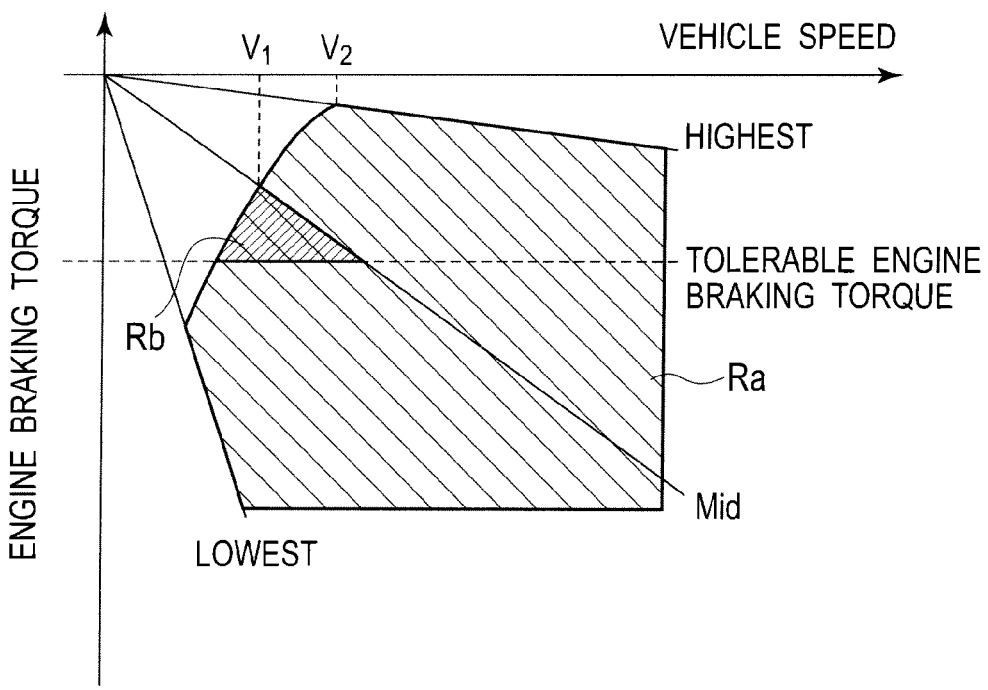

FIGS. 4A and 4B are correlation diagrams showing a relationship between the vehicle speed and the braking torque attributable to the lost torque of the engine (i.e., the engine braking torque) which is calculated in terms of the torque of the drive shaft. FIG. 4A shows the relationship at the highest transmission gear ratio, and FIG. 4B shows the relationship at the middle transmission gear ratio. First of all, the capability to return to the lowest transmission gear ratio (called the return-to-low capability below) needs to be secured in order that the hybrid vehicle can smoothly start even if the vehicle once stops as a result of the continued deceleration. FIGS. 4A and 4B each show a range Ra where the continuously variable transmission mechanism 5 can return to the lowest transmission gear ratio. As shown in FIGS. 4A and 4B, during the deceleration with the first clutch 4 engaged, the continuously variable transmission mechanism 5 at the highest transmission gear ratio can return to the lowest transmission gear ratio in a case where the vehicle speed is equal to or faster than v2. In addition, during the deceleration with the first clutch 4 engaged, the continuously variable transmission mechanism 5 at the middle transmission gear ratio can return to the lowest transmission gear ratio in a case where the vehicle speed is equal to or faster than v1.

There exists a tolerable engine braking torque when ride comfort of the hybrid vehicle is taken into consideration. To put it specifically, in a case where the engine braking torque becomes too large, the engine brake works too sharply, and the ride comfort accordingly deteriorates. For this reason, the engine torque needs to be equal to or less than the tolerable engine braking torque shown in FIGS. 4A and 4B.

The collectable regenerative torque (see a range Rb) is determined with the foregoing factors taken into consideration. In this respect, as shown in FIGS. 4A and 4B, the range Rb is wider when the highest gear is used than when the middle gear is used. For this reason, one may consider that, in the case where the regeneration is performed with the first clutch 4 engaged during the deceleration of the vehicle, the efficiency of the regeneration increases when the transmission gear ratio of the continuously variable transmission mechanism 5 is made smaller than the transmission gear ratio used for the shift control to be performed by the first shift controlling unit 12.

Figure 5:
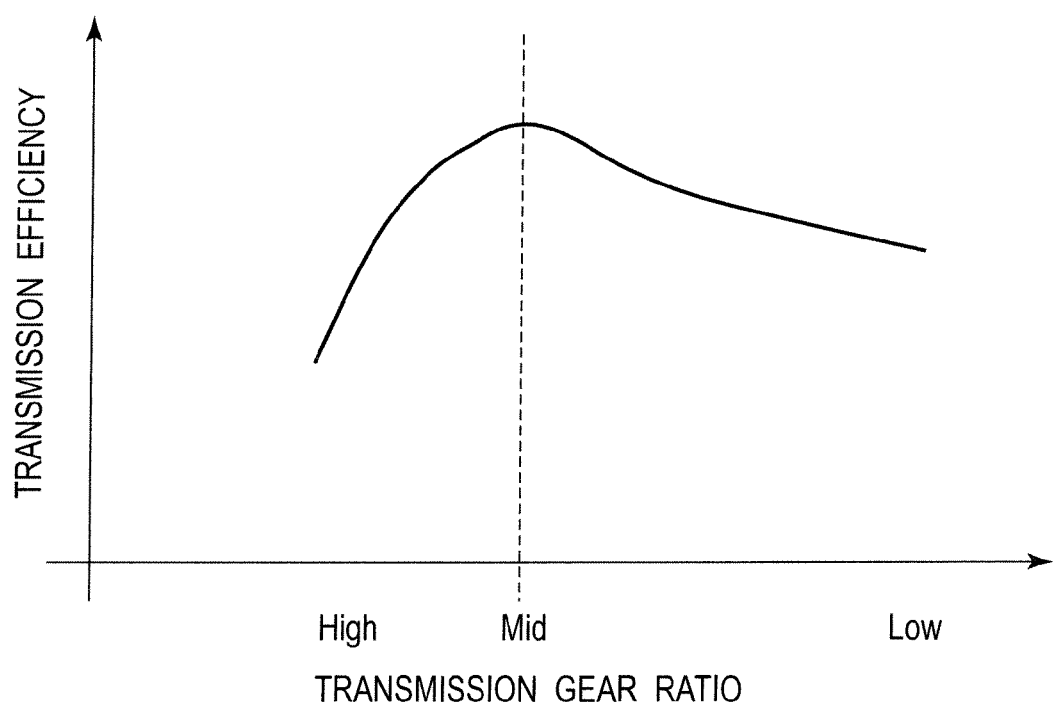
FIG. 5 is a correlation diagram showing a relationship between transmission efficiency and a transmission gear ratio of a continuously variable transmission mechanism.

FIG. 5 is a correlation diagram showing a relationship between transmission efficiency and a transmission gear ratio of the continuously variable transmission mechanism 5. It is desirable that the second shift controlling unit 13 should control the continuously variable transmission mechanism 5 with the transmission efficiency of the continuously variable transmission mechanism 5 also taken into consideration. As shown in FIG. 5, the continuously variable transmission mechanism 5 tends to change a transmission loss depending on the transmission gear ratio. For this reason, the second shift controlling unit 13 is desired to make the transmission gear ratio of the continuously variable transmission mechanism 5 high to a minimum extent to prevent the efficiency of the power transmission from becoming extremely poor as a result of making the transmission gear ratio too small. The transmission gear ratio is decided by using the correlation diagram of FIG. 5 in case that the first shift controlling unit 12 performs the shift control based on the efficiency of the power transmission of the continuously variable transmission mechanism 5.

Figure 6:
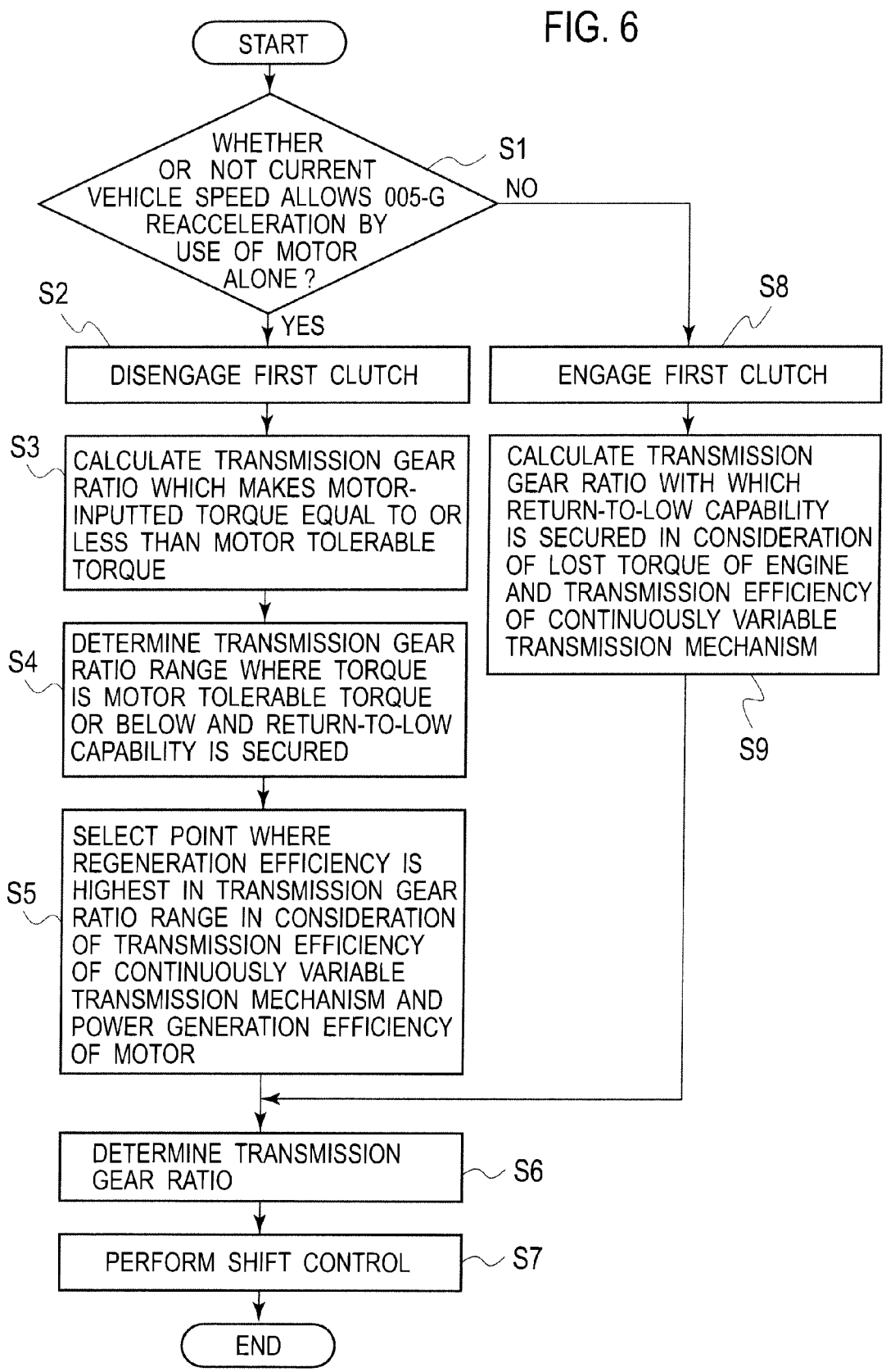
FIG. 6 is a flowchart showing a shift controlling method of the embodiment.

Next, descriptions will be provided for a shift controlling method of the embodiment. FIG. 6 is a flowchart showing a shift controlling method of the embodiment. Incidentally, the processing in the flowchart shown in FIG. 6 is repeatedly executed during the deceleration of the hybrid vehicle.

As shown in FIG. 6, first of all, the clutch controlling unit 11 judges whether or not the current vehicle speed allows a 0.05-G reacceleration by use of the motor 3 alone (in step S1). If the clutch controlling unit 11 judges that the current vehicle speed allows the 0.05-G reacceleration by use of the motor 3 alone (if Yes) (in step S1), the clutch controlling unit 11 disengages the first clutch 4 (in step S2).

Subsequently, the first shift controlling unit 12 calculates a transmission gear ratio which makes motor input torque, which is inputted into the motor 3 from the driving wheels 9L, 9R, equal to or less than the motor tolerable torque (in step S3). Thereafter, the first shift controlling unit 12 determines a transmission gear ratio range which is equal to or less than the motor tolerable torque, and which enables the return-to-low capability to be secured (in step S4).

Afterward, in consideration of the transmission efficiency of the continuously variable transmission mechanism 5 and the power generation efficiency of the motor 3, the first shift controlling unit 12 selects a point where the regeneration efficiency is the highest in the transmission gear ratio range determined in step S4 (in step S5). After that, the first shift controlling unit 12 determines a transmission gear ratio calculated from the point which makes the regeneration efficiency the highest (in step S6), and thus performs the shift control (in step S7). Subsequently, the process shown in FIG. 6 is terminated.

On the other hand, if the clutch controlling unit 11 judged that the current vehicle speed does not allow the 0.05-G reacceleration by use of the motor 3 alone (if NO) (in step S1), the clutch controlling unit 11 engages the first clutch 4 (in step S8). Subsequently, the second shift controlling unit 13 calculates a transmission gear ratio with which the return-to-low capability can be secured in consideration of the lost torque of the engine and the transmission efficiency of the continuously variable transmission mechanism 5 (in step S9). On this occasion, the second shift controlling unit 13 calculates the transmission gear ratio from: the region Ra where the return-to-low capability can be secured, as shown in FIG. 4; data on the correlation between the lost torque of the engine and the revolution speed of the engine, as shown in FIG. 3; and data on the correlation between the transmission gear ratio and the transmission efficiency, as shown in FIG. 5.

Thereafter, the second shift controlling unit 13 determines the transmission gear ratio (in step S6), and performs the shift control (in step S7). After that, the process shown in FIG. 6 is terminated.

Figure 7A:
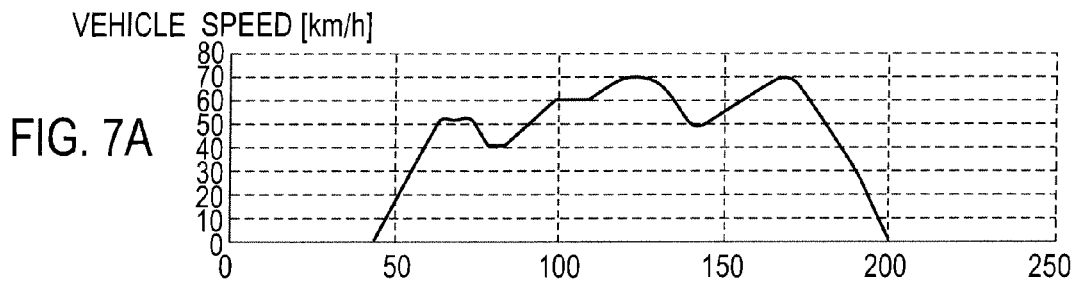
FIGS. 7A to 7D are graphs showing pieces of data which correspond to the behaviors of the hybrid vehicle, respectively.
Figure 7B:
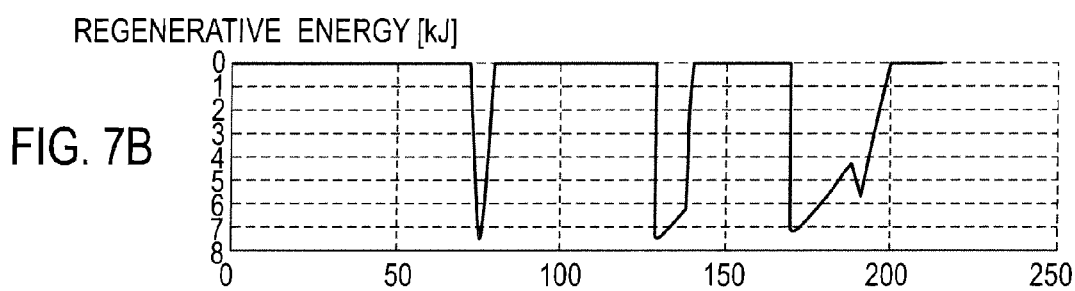
Figure 7C:
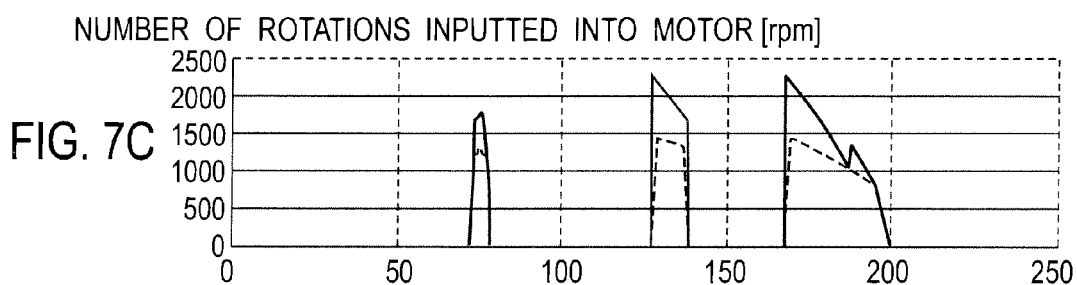
Figure 7D:
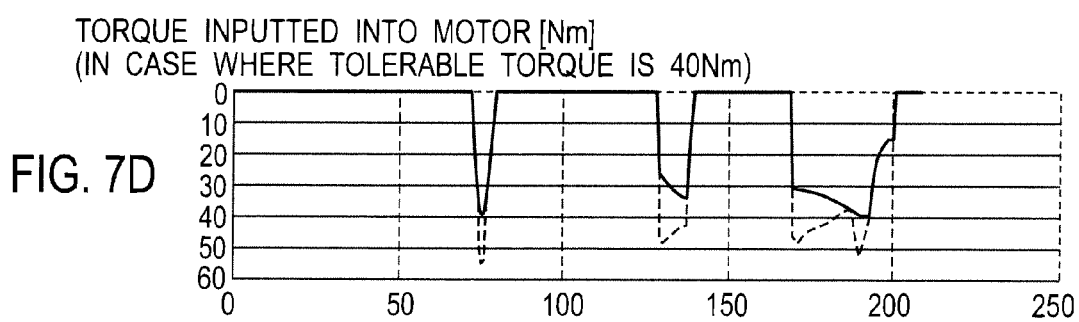

FIGS. 7A to 7D are graphs showing pieces of data which correspond to the behavior of the hybrid vehicle, respectively. FIG. 7A shows the vehicle speed [km/h]; FIG. 7B shows the regenerative energy [kJ]; FIG. 7C shows the number of rotations [rpm] inputted into the motor; and FIG. 7D shows the torque [Nm] inputted into the motor. FIG. 8A to 8E are graphs showing transmission gear ratios of the hybrid vehicle, respectively. Incidentally, the pieces of data, which are respectively shown in FIGS. 7A to 7D and FIG. 8A to 8E, represent pieces of data which are acquired when the control is performed by the second shift controlling unit 13 with the first clutch 4 disengaged.

First of all, let us assume that, as shown in FIG. 7A, the hybrid vehicle starts acceleration at time 45 [arbitrary units], and the vehicle speed reaches 50 km/h at about time 60. During this time period, the vehicle is not in the process of decelerating, and the regenerative energy is 0 (zero) kJ, as shown in FIG. 7B. In addition, as shown in FIGS. 7C and 7D, the number of rotations which is inputted into the motor 3 is 0 (zero) rpm, and the torque which is inputted into the motor 3 is 0 (zero) Nm. Furthermore, as shown in FIG. 7B, during this time period, the transmission gear ratio decreases as the vehicle speed increases.

Figure 8A:
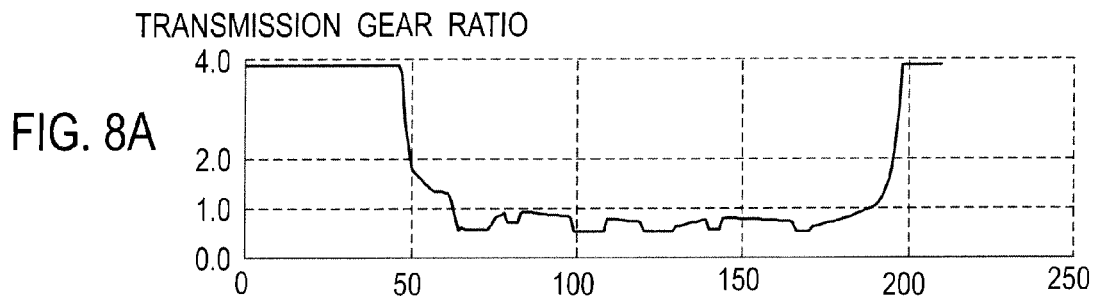
FIG. 8A to 8E are graphs showing transmission gear ratios of the hybrid vehicle, respectively.
Figure 8B:
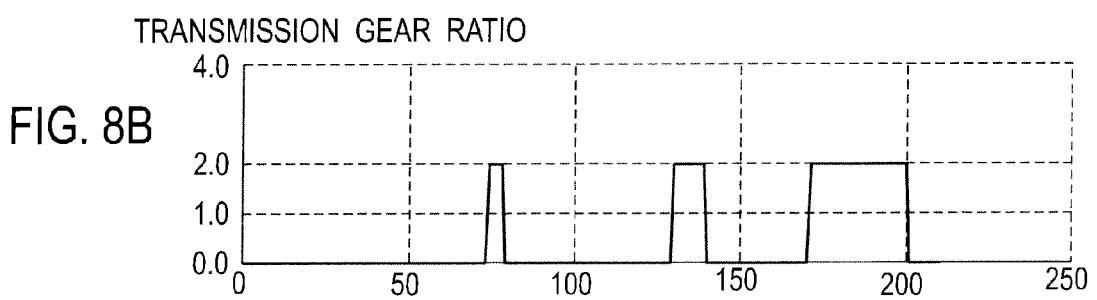

Next, let us assume that, as shown in FIG. 7A, the hybrid vehicle runs at a constant speed until about time 73, and thereafter decelerates until about time 78. On this occasion, the clutch controlling unit 11 disengages the first clutch 4. Subsequently, if the clutch controlling unit 11 performed the control only for securing the return-to-low capability, the transmission gear ratio would become less than 1 (one), the number of rotations inputted into the motor would become equal to 1300 rpm, and the torque inputted into the motor would become equal to 55 Nm, as shown in FIGS. 7C and 7D (see the dashed lines in FIGS. 7C and 7D, and the solid line in FIG. 8A, respectively). Incidentally, deceleration flags indicated by the solid line in FIG. 8B are those which occur during the deceleration.

Figure 8C:
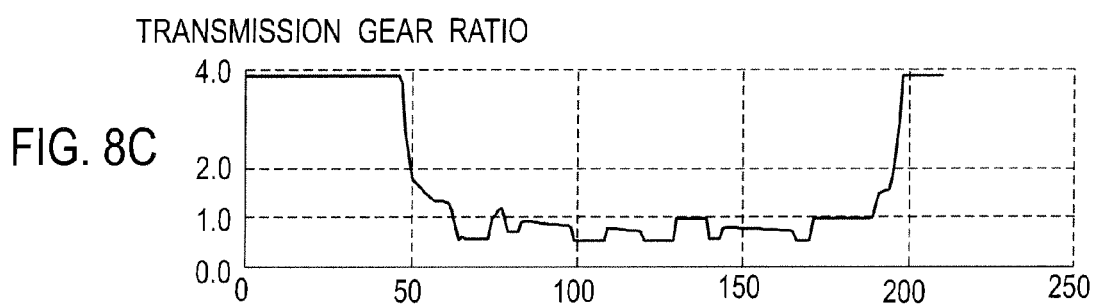
Figure 8D:
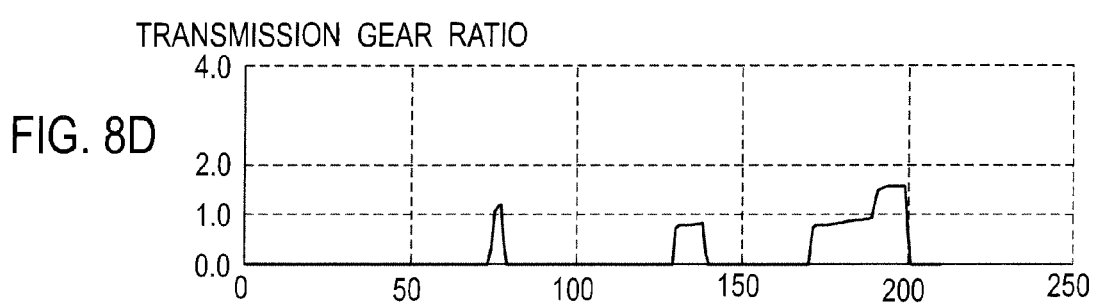
Figure 8E:
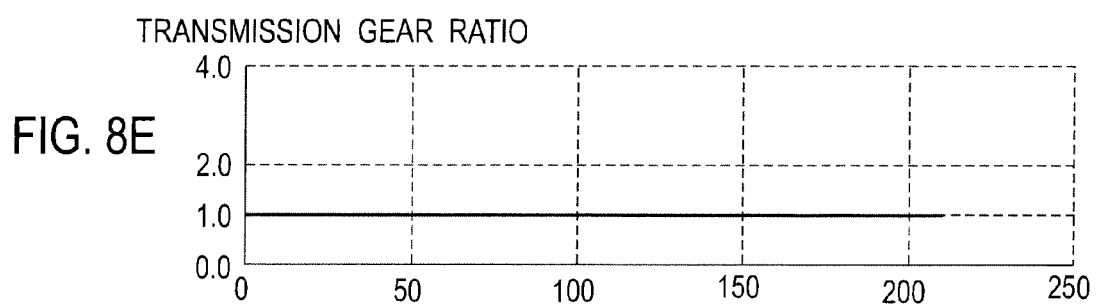

However, in the case where, like in the embodiment, the clutch controlling unit 11 performs the control in consideration of not only the return-to-low capability but also the motor tolerable torque and the transmission efficiency of the continuously variable transmission mechanism 5, the transmission gear ratio, the number of rotations inputted into the motor and the torque inputted into the motor are represented as shown by the solid lines in FIGS. 7C, 7D and 8C, respectively. To put it specifically, when the motor tolerable torque is 40 Nm, the transmission gear ratio is approximately 1.2, as indicated by the solid line in FIG. 8C. As a result, the torque inputted into the motor is 40 Nm, as indicated by the solid line in FIG. 7D. Incidentally, because, as indicated by the solid line in FIG. 8C, the transmission gear ratio is approximately 1.2, the number of rotations inputted into the motor is 1800 rpm. In addition, on this occasion, the regenerative energy is 7.5 kJ, as shown in FIG. 7B. Furthermore, the solid line shown in FIG. 8D represents the transmission gear ratio which is acquired when the torque inputted into the motor is 40 Nm.

Let us assume that: the vehicle subsequently accelerates and then runs at a constant speed until about time 130; and thereafter, the vehicle decelerates until about time 140. In this case, too, the torque inputted into the motor is controlled in order that the torque inputted into the motor is equal to or less than 40 Nm, which is the motor tolerable torque. Moreover, the first shift controlling unit 12 takes the transmission efficiency of the continuously variable transmission mechanism 5 into consideration as well. For this reason, if the transmission gear ratio is approximately 0.8, the torque inputted into the motor may be set at 40 Nm. However, if the first shift controlling unit 12 judges that the transmission efficiency is the highest when the transmission gear ratio is 1 (one) (see the solid line in FIG. 8E), the first shift controlling unit 12 sets the transmission gear ratio at 1 (one). Thereby, the torque inputted into the motor is 3.0 Nm, as indicated by the solid line in FIG. 7D. Incidentally, because, as indicated by the solid line in FIG. 8C, the transmission gear ratio is approximately 1.0, the number of rotations inputted into the motor is around 2200 rpm. In addition, the regenerative energy is around 7.5 kJ, as shown in FIG. 7B.

Furthermore, as for the deceleration during the time period between time 170 and time 200, similarly, the first shift controlling unit 12 determines the transmission gear ratio on the basis of the return-to-low capability, the motor tolerable torque, and the transmission efficiency of the continuously variable transmission mechanism 5.

The operation controller 10 and the shift controlling method of the embodiment as described above can make the transmission efficiency of the continuously variable transmission mechanism 5 and the power generation efficiency of the motor 3 adequate, and accordingly can enhance the regeneration efficiency during the deceleration of the vehicle. That is because, in the case where the regeneration is performed with the first clutch 4 disengaged during the deceleration of the vehicle, the shift control is performed on the basis of at least one of the transmission efficiency of the continuously variable transmission mechanism 5 and the power generation efficiency of the motor 3. Furthermore, in the case where the regeneration is performed with the first clutch 4 engaged during the deceleration of the vehicle, the shift control is performed to make the transmission gear ratio of the continuously variable transmission mechanism 5 smaller than in the foregoing shift control performed. In this respect, loss in engine torque can be reduced in exchange of decrease in the transmission gear ratio. For this reason, in a case where the motor 3 and the engine 2 are connected to the continuously variable transmission mechanism 5 by engaging of the first clutch 4, the regeneration efficiency during the deceleration can be enhanced by reducing the loss in the engine torque. Accordingly, the regeneration efficiency can be enhanced even while the first clutch 4 is kept engaged.

Moreover, when the regeneration is to be performed with the first clutch 4 disengaged, the shift control is performed in order that the torque inputted into the motor should be equal to or less than the motor tolerable torque which the motor 3 can tolerate. For this reason, it is possible to prevent the occurrence of the situation in which the motor 3 cannot collect the regenerative torque because the torque needed for the reacceleration exceeds the motor tolerable torque. In addition, because the shift control is performed in order that the transmission gear ratio should become the highest when the hybrid vehicle stops as a result of the continued deceleration of the vehicle, the hybrid vehicle is capable of smoothly starting even if the hybrid vehicle stops.

The control is performed to choose between performing the regeneration with the first clutch 4 disengaged and performing the regeneration with the first clutch 4 engaged on the basis of the judgment on whether or not the reacceleration can be achieved by use of only the motor 3 during the deceleration. In this respect, in the case where the reacceleration cannot be achieved by use of only the motor 3 during the deceleration, the reacceleration needs to be achieved by use of the engine 2. On the other hand, in the case where the reacceleration can be achieved by use of only the motor 3 during the deceleration, the engine 2 need not be used. In sum, when the control is performed as described above, it is possible to maintain the acceleration performance while enhancing the regeneration efficiency.

The foregoing descriptions have been provided for the present invention on the basis of the embodiment. However, the present invention is not limited to the above-described embodiment. Modifications may be added to the present invention within the scope not departing from the gist of the present invention.

In the above-described embodiment, for example, the hybrid vehicle is equipped with the continuously variable transmission mechanism 5. However, the present invention is not limited to this example, and the hybrid vehicle may be equipped with a transmission mechanism other than the continuously variable transmission mechanism 5. Moreover, although the hybrid vehicle is equipped with the second clutch 7, the hybrid vehicle does not necessarily have to be equipped with the second clutch 7.

This application is based on prior Japanese Patent Applications No. 2010-145939 (filed Jun. 28, 2010 in Japan), No. 2011-85432 (filed Apr. 7, 2011 in Japan) and No. 2011-136848 (filed Jun. 21, 2011 in Japan). The entire contents of the Japanese Patent Applications No. 2010-145939, No. 2011-85432 and No. 2011-136848 from which priority is claimed are incorporated herein by reference, in order to take some protection against translation errors or omitted portions.

What is claimed is:

1. A shift controller for a hybrid vehicle in which: an engine and a motor are connected together via a clutch; and a transmission is placed between the motor and driving wheels,
    the shift controller comprising:
    a first shift controlling unit configured to perform shift control on a basis of at least one of transmission efficiency of the transmission and power generation efficiency of the motor in a case where regeneration is performed with the clutch disengaged during deceleration of the hybrid vehicle; and
    a second shift controlling unit configured to perform shift control to make a transmission gear ratio of the transmission smaller than in the shift control performed by the first shift controlling unit in a case where the regeneration is performed with the clutch engaged during the deceleration of the hybrid vehicle.

2. The shift controller according to claim 1, wherein
    in the regeneration with the clutch disengaged, the first shift controlling unit performs the shift control to make torque inputted into the motor equal to or less than a motor tolerable torque that is a torque tolerable by the motor.

3. The shift controller according to claim 1, wherein
    in the regeneration with the clutch disengaged, the first shift controlling unit performs the shift control to make the transmission gear ratio highest when the hybrid vehicle stops as a result of continued deceleration of the hybrid vehicle.

4. The shift controller according to claim 1, wherein
    in the regeneration with the clutch disengaged, the first shift controlling unit performs the shift control to make torque inputted into the motor equal to or less than a motor tolerable torque that is a torque tolerable by the motor; and to make the transmission gear ratio highest when the hybrid vehicle stops as a result of continued deceleration of the vehicle.

5. The shift controller according to claim 1, wherein
in the regeneration with the clutch engaged, the second shift controlling unit performs the shift control to make a torque lost by the engine equal to or less than a engine tolerable torque that is a torque tolerable by the engine.

6. The shift controller according to claim 1, wherein
in the regeneration with the clutch engaged, the second shift controlling unit performs the shift control to make the transmission gear ratio highest when the hybrid vehicle stops as a result of continued deceleration of the hybrid vehicle.

7. The shift controller according to claim 1, wherein
the second shift controlling unit control the transmission with the transmission efficiency of the transmission taken into account.

8. The shift controller according to claim 1, further comprising
a clutch controlling unit configured to control whether to engage or disengage the clutch to perform the regeneration on a basis of judgment on whether or not the reacceleration is achievable by use of only the motor during the deceleration.

9. The shift controller according to claim 8, wherein
the clutch controlling unit is configured to perform the regeneration with the clutch engaged when the torque needed for the reacceleration is larger than the maximum torque which the motor is capable of producing, and perform the regeneration with the clutch disengaged when the torque needed for the reacceleration is equal to or less than the maximum torque which the motor is capable of producing.

10. A shift controlling method for a hybrid vehicle in which: an engine and a motor are connected together via a clutch; and a transmission is placed between the motor and driving wheels,
the shift controlling method comprising:
a first shift controlling operation of performing shift control on a basis of at least one of transmission efficiency of the transmission and power generation efficiency of the motor in a case where regeneration is performed with the clutch disengaged during deceleration of the hybrid vehicle; and
a second shift controlling operation of performing shift control to make a transmission gear ratio of the transmission smaller than in the shift control performed in the first shift controlling operation in a case where the regeneration is performed with the clutch engaged during the deceleration of the hybrid vehicle.

11. The shift controlling method according to claim 10, wherein
the first shift controlling operation includes performing the shift control to make torque inputted into the motor equal to or less than a motor tolerable torque that is a torque tolerable by the motor.

12. The shift controlling method according to claim 10, wherein
the first shift controlling operation includes performing the shift control to make the transmission gear ratio highest when the hybrid vehicle stops as a result of continued deceleration of the hybrid vehicle.

13. The shift controlling method according to claim 10, wherein
the first shift controlling operation includes performing the shift control to make torque inputted into the motor equal to or less than a motor tolerable torque that is a torque tolerable by the motor; and to make the transmission gear ratio highest when the hybrid vehicle stops as a result of continued deceleration of the vehicle.

14. The shift controlling method according to claim 10, wherein
the second shift controlling operation includes performing the shift control to make a torque lost by the engine equal to or less than a engine tolerable torque that is a torque tolerable by the engine.

15. The shift controlling method according to claim 10, wherein
the second shift controlling operation includes performing the shift control to make the transmission gear ratio highest when the hybrid vehicle stops as a result of continued deceleration of the hybrid vehicle.

16. The shift controlling method according to claim 10, wherein
the first shift controlling operation includes controlling the transmission with the transmission efficiency of the transmission taken into account.

17. The shift controlling method according to claim 10, further comprising
a clutch controlling operation of controlling whether to engage or disengage the clutch to perform the regeneration on a basis of judgment on whether or not the reacceleration is achievable by use of only the motor during the deceleration.

18. The shift controlling method according to claim 17, wherein
the clutch controlling operation includes:
performing the regeneration with the clutch engaged when the torque needed for the reacceleration is larger than the maximum torque which the motor is capable of producing; and,
performing the regeneration with the clutch disengaged when the torque needed for the reacceleration is equal to or less than the maximum torque which the motor is capable of producing.

19. A shift controller for a hybrid vehicle in which; an engine and a motor are connected together via a clutch; and a transmission is placed between the motor and driving wheels,
the shift controller comprising:
first shift controlling means for performing shift control on a basis of at least one of transmission efficiency of the transmission and power generation efficiency of the motor in a case where regeneration is performed with the clutch disengaged during deceleration of the hybrid vehicle; and
second shift controlling means for performing shift control to make a transmission gear ratio of the transmission smaller than in the shift control performed by the first shift controlling unit in a case where the regeneration is performed with the clutch engaged during the deceleration of the hybrid vehicle.

* * * * *